United States Patent
Fukaya et al.

(10) Patent No.: US 12,384,378 B2
(45) Date of Patent: Aug. 12, 2025

(54) CONTROL APPARATUS AND CONTROL METHOD

(71) Applicant: TOYOTA JIDOSHA KABUSHIKI KAISHA, Toyota (JP)

(72) Inventors: Motohiro Fukaya, Susono (JP); Kentaro Takahashi, Shizuoka (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 123 days.

(21) Appl. No.: 18/382,719

(22) Filed: Oct. 23, 2023

(65) Prior Publication Data
US 2024/0157945 A1 May 16, 2024

(30) Foreign Application Priority Data
Nov. 15, 2022 (JP) ................... 2022-182745

(51) Int. Cl.
*B60W 30/18* (2012.01)
*B60W 30/16* (2020.01)
*B60W 50/14* (2020.01)

(52) U.S. Cl.
CPC .... *B60W 30/18163* (2013.01); *B60W 30/162* (2013.01); *B60W 50/14* (2013.01)

(58) Field of Classification Search
CPC ......... B60W 30/18163; B60W 30/162; B60W 50/14; B60W 2554/802; B60W 2554/804; B60Q 1/38
See application file for complete search history.

(56) References Cited

U.S. PATENT DOCUMENTS

| | | | |
|---|---|---|---|
| 10,793,147 B2 | 10/2020 | Kaminade et al. | |
| 10,870,349 B2 | 12/2020 | Uejima | |
| 10,953,883 B2 | 3/2021 | Sakaguchi | |
| 10,981,569 B2 | 4/2021 | Hashimoto et al. | |
| 11,014,563 B2 | 5/2021 | Hashimoto et al. | |
| 11,072,334 B2 | 7/2021 | Aoki et al. | |
| 11,267,473 B2 | 3/2022 | Takahashi | |
| 11,279,360 B2 | 3/2022 | Fukuda et al. | |
| 2009/0088925 A1* | 4/2009 | Sugawara | B60W 30/12 340/436 |
| 2017/0210360 A1* | 7/2017 | Ito | G08G 1/16 |
| 2018/0293894 A1* | 10/2018 | Zhang | B60W 50/14 |
| 2019/0061766 A1* | 2/2019 | Nishiguchi | B62D 15/0255 |
| 2020/0070889 A1 | 3/2020 | Fukuda et al. | |
| 2020/0207353 A1* | 7/2020 | Chen | B60W 30/18163 |
| 2020/0247400 A1 | 8/2020 | Fujii | |

FOREIGN PATENT DOCUMENTS

| | | |
|---|---|---|
| JP | 2021-039688 A | 3/2021 |
| JP | 2021-123151 A | 8/2021 |

* cited by examiner

*Primary Examiner* — Sizo B Vilakazi
(74) *Attorney, Agent, or Firm* — Dinsmore & Shohl LLP

(57) ABSTRACT

The present disclosure proposes a technique regarding a control apparatus for controlling a vehicle. The control apparatus is configured to execute the following first to third processes. The first process is determining whether or not a required space for performing a lane change is secured in an adjacent lane in response to a request for the lane change to the adjacent lane of the vehicle. The second process is operating a direction indicator of the vehicle when the required space is not secured. The third process is starting the lane change to the adjacent lane of the vehicle by autonomous driving when the required space is secured.

5 Claims, 6 Drawing Sheets

CONTROL APPARATUS AND CONTROL METHOD

CROSS-REFERENCE TO RELATED APPLICATIONS

The present application claims priority under 35 U.S.C. § 119 to Japanese Patent Application No. 2022-182745, filed on Nov. 15, 2022, the contents of which application are incorporated herein by reference in their entirety.

TECHNICAL FIELD

The present disclosure relates to a technique for controlling a vehicle, particularly, to perform a lane change. In particular, the present disclosure relates to a technique for control for causing a vehicle to change lanes.

BACKGROUND ART

In recent years, various techniques have been proposed regarding control for performing a lane change of a vehicle as an autonomous driving function or a driving assistance function.

For example, Patent Literature 1 discloses a controller of a vehicle configured to execute:
  determining whether or not it is possible to perform a lane change based on a recognition result of an external environment recognition unit;
  generating a linear lane change path from a current lane to a lane change destination lane with an angle according to a vehicle speed of the vehicle;
  performing the lane change of the vehicle along the generated linear lane change path when it is determined that it is possible to perform the lane change; and
  determining whether or not it is possible to continue performing the lane change when the vehicle moves, after starting the lane change, to a position of a predetermined distance in a lateral direction from a position before the lane change.

In addition, there is the following Patent Literature 2 as a document showing the technical level of the technical field according to the present disclosure.

LIST OF RELATED ART

Patent Literature 1: JP 2021/123151 A
Patent Literature 2: JP 2021/039688 A

SUMMARY

As disclosed in Patent Literature 1, in control for performing a lane change of a vehicle, it is determined whether or not it is possible to perform the lane change based on a recognition result of a current surrounding environment. Conventionally, when it is determined that it is not possible to perform the lane change, the execution of the lane change is interrupted.

The interrupting the execution of the lane change would be contrary to a request for the lane change by an autonomous driving system or a driver. For this reason, when there is a high possibility that the execution of the lane change is interrupted in response to a request for the lane change, there is a concern that a decrease in the autonomous driving function or a decrease in the usability may be caused.

In view of the above problem, an object of the present disclosure is to provide, regarding control for performing a lane change of a vehicle, a technique that makes it possible to increase the possibility of execution of the lane change.

A first aspect of the present disclosure is directed to a control apparatus for controlling a vehicle.

The control apparatus is configured to execute:
  determining whether or not a required space for performing a lane change is secured in an adjacent lane in response to a request for the lane change to the adjacent lane of the vehicle;
  operating a direction indicator of the vehicle when the required space is not secured: and starting the lane change to the adjacent lane of the vehicle by autonomous driving when the required space is secured.

A second aspect of the present disclosure is directed to a control method for controlling a vehicle.

The control method includes:
  determining whether or not a required space for performing a lane change is secured in an adjacent lane in response to a request for the lane change to the adjacent lane of the vehicle;
  operating a direction indicator of the vehicle when the required space is not secured: and
  starting the lane change to the adjacent lane of the vehicle by autonomous driving when the required space is secured.

According to the present disclosure, when the required space for performing a lane change is not secured in an adjacent lane to be the lane change destination, the direction indicator of the vehicle is operated. By operating the direction indicator, the intention of starting the lane change is notified to the following vehicle traveling in the adjacent lane. Thus, it is possible to expect that the following vehicle travels so as to ensure the required space. When the required space is secured, the lane change is started. As described above, according to the present disclosure, it is possible to provide control with a high possibility of execution of the lane change.

DETAILED DESCRIPTION

Hereinafter, an embodiment will be described with reference to the drawings.

1. Configuration

Figure 1:
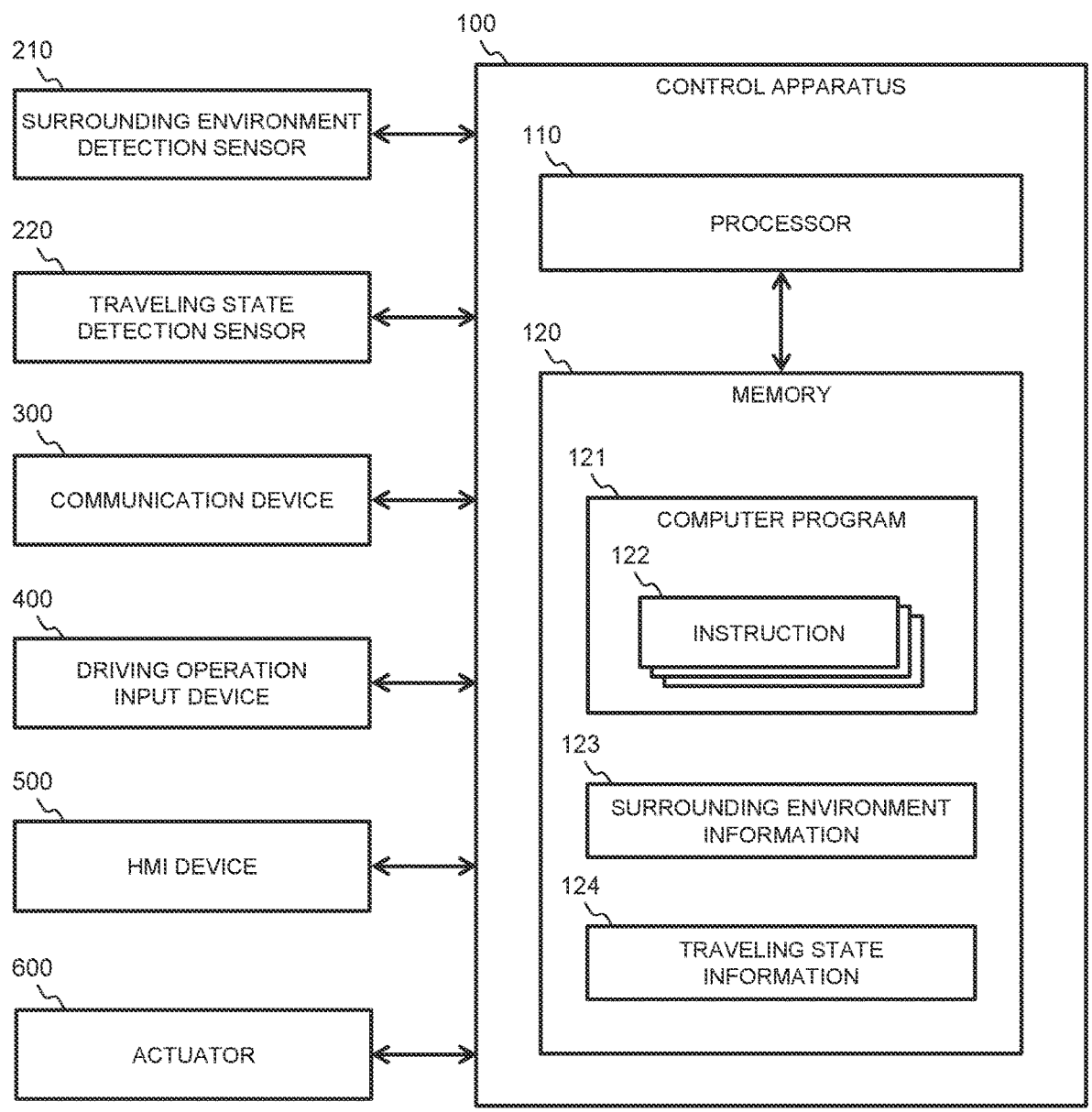
FIG. 1 is a diagram for explaining a configuration of a control apparatus according to the present embodiment.

FIG. 1 is a block diagram for explaining a configuration of a control apparatus 100 according to the present embodiment. The control apparatus 100 is a computer that executes processing related to control of the vehicle. For example, the control apparatus 100 includes one or a plurality of electronic control units (ECUs) provided in the vehicle. However, the control apparatus 100 may be a computer that is an external apparatus of the vehicle and controls the vehicle by communication. Hereinafter, a vehicle to be controlled by the control apparatus 100 is referred to as an "own vehicle".

The control apparatus 100 is communicably connected to the surrounding environment detection sensor 210, the traveling state detection sensor 220, the communication device 300, the driving operation input device 400, the HMI device 500, and the actuator 600. For example, the control apparatus 100 is connected to these devices via an in-vehicle network configured by a control area network (CAN) or the like.

The surrounding environment detection sensor 210 detects a surrounding environment of the vehicle (a surrounding vehicle, a pedestrian, a lane, or the like) and outputs information of a detection target. Examples of the surrounding environment detection sensor 210 include a camera, a millimeter-wave radar, and a light detection and ranging (LiDAR). In the present embodiment, the surrounding environment detection sensor 210 includes a sensor arranged to be able to detect vehicles traveling in the adjacent lane. For example, the surrounding environment detection sensor 210 includes a plurality of LiDARs disposed on the front lateral side and the rear lateral side of the host vehicle.

The traveling state detection sensor 220 detects and outputs a traveling state (vehicle speed, acceleration, yaw rate, etc.) of the own vehicle. Examples of the traveling state detection sensor 220 include a wheel speed sensor, an inertial measurement unit (IMU), and the like.

The communication device 300 communicates with a device outside the host vehicle to transmit and receive information. Examples of the communication device 300 include a device that communicates with a server on the Internet via a moving body communication network, a device that communicates with an infrastructure or a peripheral vehicle, and a global navigation satellite system (GNSS) receiver. Examples of the information received by the communication device 300 include map information, road traffic information, and GNSS position information.

The driving operation input device 400 is a device that receives a driving operation of the driver of the host vehicle. Examples of the driving operation input device 400 include a gas pedal, a brake pedal, and a steering wheel.

The HMI device 500 provides a human machine interface (HMI) function. Examples of the HMI device 500 include a display, a speaker, a switch, an indicator, and the like.

The actuator 600 operates in accordance with a control signal acquired from the control apparatus 100. Examples of the actuator 600 include an actuator related to an operation of a power unit (an internal combustion engine, an electric motor, or the like), an actuator related to an operation of a brake mechanism, an actuator related to an operation of a steering mechanism, and the like. In the present embodiment, the actuator 600 includes an actuator (for example, a relay switch) related to the operation of the direction indicator of the host vehicle.

The control apparatus 100 includes one or more processors 110 (hereinafter, simply referred to as a processor 110) and one or more memories 120 (hereinafter, simply referred to as a memory 120). The processor 110 executes various types of processing and generates control signals. The processor 110 can be configured with, for example, a central processing unit (CPU) including an arithmetic unit, a register, and the like. The memory 120 is coupled to the processor 110 and stores various types of information required for the processor 110 to execute processing. The memory 120 can be configured by a recording medium such as a read only memory (ROM), a random-access memory (RAM), a hard disk drive (HDD), or a solid-state drive (SSD).

A computer program 121, surrounding environment information 123, and traveling state information 124 are stored in the memory 120.

The computer program 121 includes a plurality of instructions 122 and is stored in a computer-readable recording medium. The processor 110 operates in accordance with the plurality of instructions 122, execution of various processes by the processor 110 is realized.

The surrounding environment information 123 is information acquired from the surrounding environment detection sensor 210. Further, the surrounding environment information 123 may include information obtained from the communication device 300. The traveling state information 124 is information acquired from the traveling state detection sensor 220.

2. Processing

The control apparatus 100 (more specifically, the processor 110) according to the present embodiment is configured to receive a request for a lane change to an adjacent lane (hereinafter, simply referred to as a "lane change request") and execute a process of causing the host vehicle to perform a lane change to the adjacent lane by autonomous driving (hereinafter, simply referred to as a "lane change process"). The control apparatus 100 may be configured to execute the lane change process as a part of the autonomous driving function, or may be configured to execute the lane change process as the driving assistance function. When the lane change process is executed as a part of the autonomous driving function, the control apparatus 100 is configured to acquire, for example, a lane change request as a driving determination related to autonomous driving. When the lane change process is executed as the driving support function, the control apparatus 100 is configured to acquire the lane change request, for example, when the driver performs a predetermined operation of the HMI device 500.

Hereinafter, the lane change process executed by the control apparatus 100 will be described.

Figure 2:
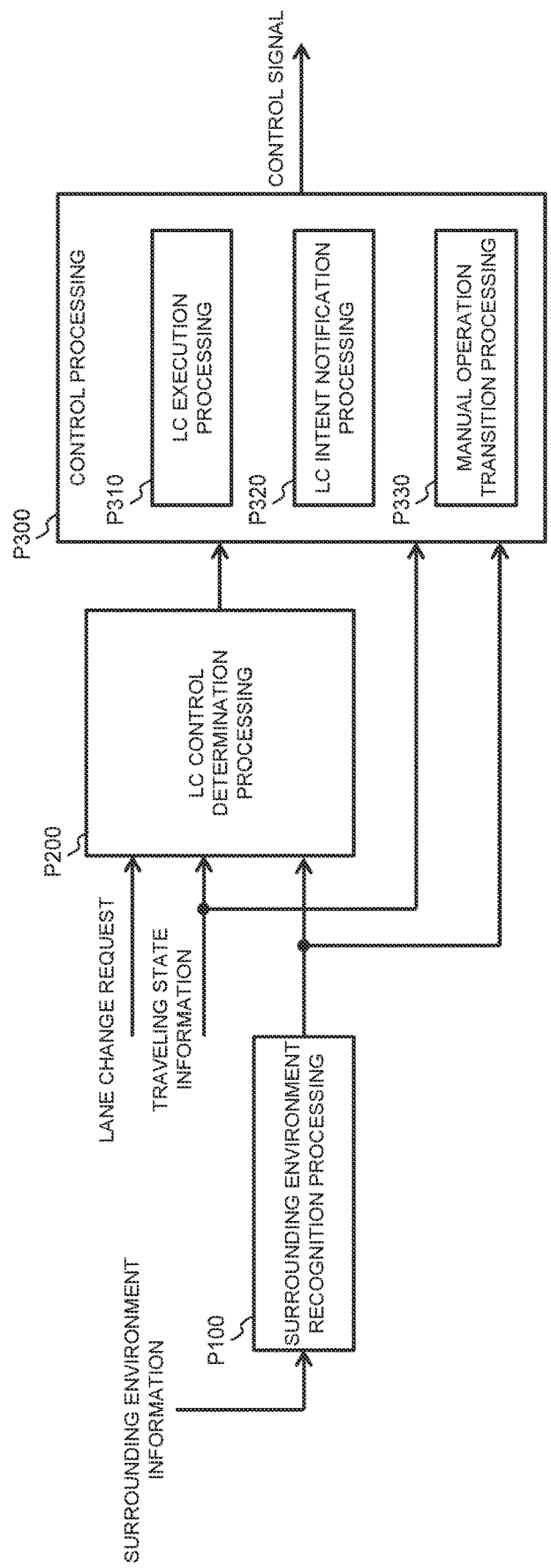
FIG. 2 is a diagram showing an example of a configuration of lane change process executed by the control apparatus according to the present embodiment.

FIG. 2 is a block diagram illustrating an example of a configuration of a lane change process executed by the control apparatus 100. In FIG. 2, the lane change process includes a surrounding environment recognition processing P100, an LC control determination processing P200, and a control processing P300.

In the surrounding environment recognition processing P100, the control apparatus 100 recognizes the surrounding environment of the host vehicle based on the surrounding environment information 123. For example, the control apparatus 100 recognizes a traveling lane and an adjacent lane, a position of the own vehicle with respect to the traveling lane and the adjacent lane, a vehicle traveling on the adjacent lane, and the like. In particular, in the surrounding environment recognition processing P100, the control apparatus 100 acquires driving traveling states of vehicles driving in the adjacent lane. For example, the control apparatus 100 recognizes vehicles traveling in adjacent lanes, and acquires the inter-vehicle distance and the relative speed for each recognized vehicle.

In the LC control determination processing P200, the control apparatus 100 determines control for the lane change request based on the traveling state information 124 and the recognition result obtained by the surrounding environment recognition processing P100. Then, in the control processing P300, the control apparatus 100 executes processing according to the determination result by the LC control determination processing P200 and generates a control signal.

More specifically, the control apparatus 100 performs control determination in the LC control determination processing P200 and executes processing in the control processing P300 as follows.

First, the control apparatus 100 determines whether or not a space required for a lane change (hereinafter referred to as "required space") is secured in an adjacent lane which is a lane change destination. The required space can be determined by, for example, a distance between a preceding vehicle at the lane change destination (hereinafter, simply referred to as a "preceding vehicle") and a following vehicle at the lane change destination (hereinafter, simply referred to as a "following vehicle"). In this case, the distance that defines the required space may be variable depending on the speed of the host vehicle or the train of vehicles at the lane change destination. Alternatively, the required space may be determined by TTC (Time to Collision) between the own vehicle and the following vehicle and the preceding vehicle.

When the required space is secured, the control apparatus 100 determines the start of a lane change in the LC control determination processing P200. At this time, in the control processing P300, the control apparatus 100 executes the LC execution processing P310. By executing the LC execution processing P310, the control apparatus 100 generates and outputs a control signal for causing the host vehicle to make a lane change to the adjacent lane. For example, the control apparatus 100 executes a process of generating a travel route related to a lane change and a process of calculating control amounts related to acceleration, braking, and steering so as to cause the host vehicle to travel along the generated travel route. The LC execution processing P310 may employ any suitable known technology. When the actuator 600 operates in accordance with the control signal generated in the LC execution processing P310, lane change of the host vehicle to the adjacent lane by autonomous driving is realized.

On the other hand, when the required space is not secured, in the LC control determination processing P200, the control apparatus 100 determines execution of notification for notifying the intention of the start of the lane change to the following vehicles traveling on the adjacent lane. At this time, in the control processing P300, the control apparatus 100 executes the LC intent notification processing P320. In the present embodiment, the notification is performed by operating a direction indicator of the host vehicle. That is, by executing the LC intent notification processing P320, the control apparatus 100 generates and outputs a control signal for operating the direction indicator in the direction of the adjacent lane which is the lane change destination. By executing the notification in this way, it is possible to prompt the following vehicle traveling in the adjacent lane to secure the required space. Accordingly, it can be expected that the following vehicle travels (for example, decelerates) so that the required space is secured.

Further, in the LC intent notification processing P320, the control apparatus 100 may be configured to control the own vehicle to approach the adjacent lane side in the traveling lane simultaneously with the operation of the direction indicator or after the elapse of a certain period. In this way, in addition to the operation of the direction indicator, by causing the own vehicle to travel closer to the adjacent lane side, which is the lane change destination, it is possible to more strongly inform the following vehicle traveling on the adjacent lane of the intention of starting the lane change.

Even during the execution of the LC intent notification processing P320, the control apparatus 100 may be configured to determine whether or not a necessary space is secured at predetermined intervals. When the necessary space is secured, the control apparatus 100 executes the LC execution process 310. As described above, according to the present embodiment, by executing the LC intent notification processing P320, it is possible to increase the possibility of executing the lane change.

Furthermore, the control apparatus 100 may be configured to execute the LC intent notification processing P320 on condition that the inter-vehicle distance and the relative velocity between the host vehicle and the following vehicle and the preceding vehicle are included in the predetermined valued range. Here, the predetermined valued range is given so that it can be expected that the required space is smoothly secured by the execution of the LC intent notification processing P320.

Figure 3A:
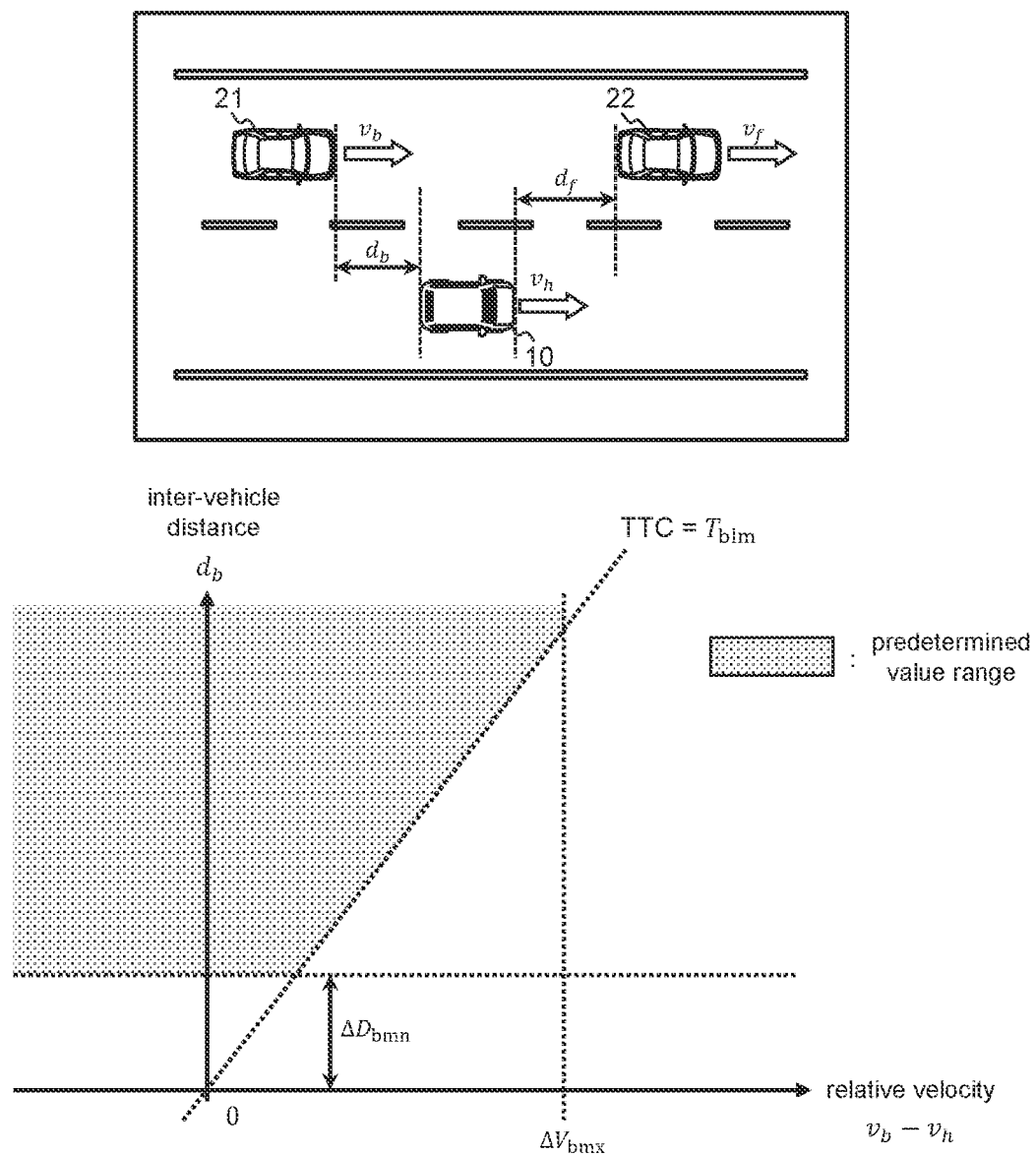
FIG. 3A is a diagram for explaining conditions for executing a process of notifying an intention of starting a lane change.
Figure 3B:
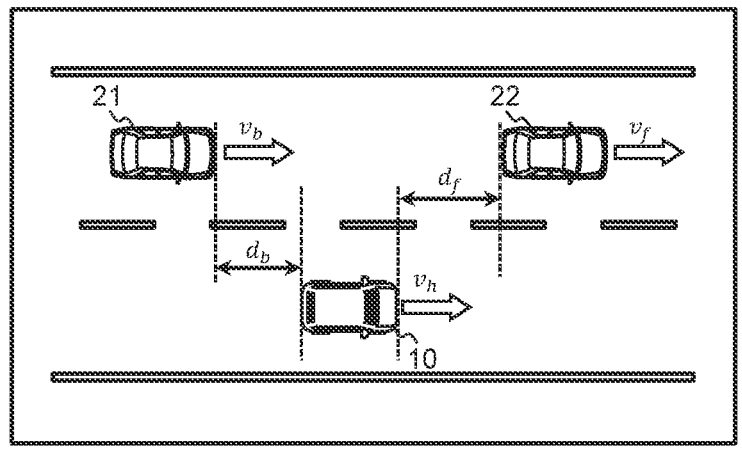
FIG. 3B is another diagram for explaining conditions for executing the process of notifying the intention of starting a lane change.
Figure 3B:
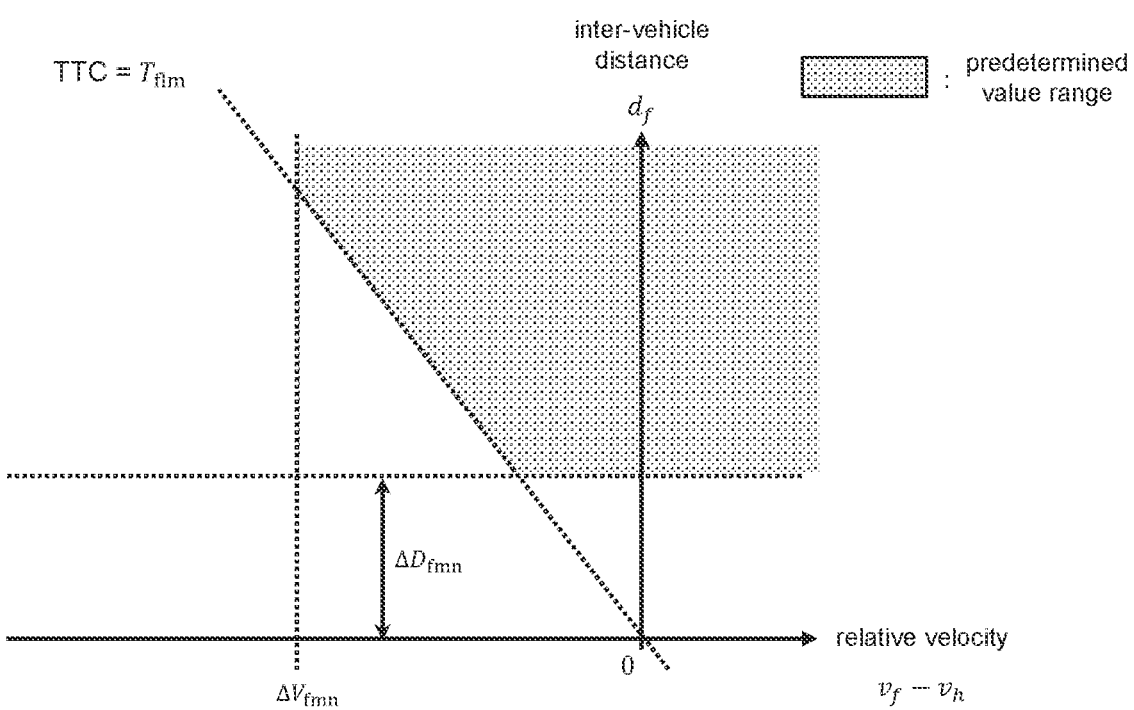

FIGS. 3A and 3B are a conceptual diagram illustrating an example of a predetermined valued range, respectively. FIG. 3A illustrates an example of the predetermined valued range related to the following vehicle 21, and FIG. 3B illustrates an example of the predetermined valued range related to the preceding vehicle 22.

As illustrated in FIG. 3A, the predetermined valued range related to the following vehicle 21 is defined by the inter-vehicle distance $d_b$ being larger than a predetermined value $\Delta D_{bmn}$, the relative velocity $v_b - v_h$ being smaller than a predetermined value $\Delta V_{bmx}$, and the TTC being larger than a predetermined value $T_{blm}$. That the inter-vehicle distance $d_b$ is greater than the predetermined value $\Delta D_{bmn}$ ensures that the notification by the execution of the LC intent notification processing P320 functions effectively. For example, $\Delta D_{bmn}$ is the lower limit of the inter-vehicle distance $d_b$ in which the driver of the following vehicle 21 can confirm the operation of the direction indicator of the host vehicle 10. The relative velocity $v_b - v_h$ being smaller than the predetermined value $\Delta V_{bmx}$ and the TTC being larger than the predetermined value $T_{blm}$ ensure that the driver of the following vehicle 21 is not burdened or anxious with excessive driving operations.

As illustrated in FIG. 3B, the predetermined valued range related to the preceding vehicle 22 is defined by the inter-vehicle distance $d_f$ being greater than a predetermined value $\Delta D_{fmn}$, the relative velocity $v_f - v_h$ being greater than a predetermined value $\Delta V_{fmn}$, and the TTC being greater than a predetermined value $T_{flm}$. That the inter-vehicle distance $d_f$ is greater than the predetermined value $\Delta D_{fmn}$ ensures that the space between the host vehicle 10 and the preceding vehicle 22 is sufficient as the required space. That the relative velocity $v_f - v_h$ is larger than the predetermined value $\Delta V_{fmn}$ and that the TTC is larger than the predetermined value $T_{flm}$ ensures a time margin for ensuring the required space by the response of the following vehicle 21. Thus, it is ensured that the driver of the host vehicle 10 is not excessively anxious.

In FIGS. 3A and 3B, the predetermined values $\Delta D_{bmn}$, $\Delta D_{fmn}$, $\Delta V_{bmx}$, $\Delta V_{fmn}$, and $T_{flm}$ may be suitably given in accordance with the environment to which the present embodiment is applied.

As described above, the execution of the LC intent notification processing P320 is performed under the condition that the inter-vehicle distance and the relative velocity between the host vehicle and the following vehicle 21 and the preceding vehicle 22 are included in the predetermined valued range. This makes it possible to prevent the LC intent notification processing P320 from being executed even when the required space cannot be ensured smoothly. Consequently, the safety of the lane change process can be guaranteed.

Further, in the LC intent notification processing P320, the control apparatus 100 may be configured to control the traveling of the host vehicle 10 so as to smoothly secure the required space. For example, the control apparatus 100 may generate a control signal for accelerating or breaking the host vehicle 10 such that an inter-vehicle distance and a relative velocity between the host vehicle and the following vehicle 21 and the preceding vehicle 22 are included in a predetermined valued range.

Refer to FIG. 2 again. In the LC control determination processing P200, when a period during which the required space is not secured exceeds a predetermined time, the control apparatus 100 determines a shift to a lane change by manual driving. At this time, in the control processing P300, the control apparatus 100 executes a manual operation transition processing P330. By executing the manual operation transition processing P330, the control apparatus 100 requests the driver of the host vehicle 10 to perform a lane change operation. For example, the control apparatus 100 receives steering of the host vehicle 10 by an operation of the driving operation input device 400. Further, in the manual operation transition processing P330, the control apparatus 100 may generate and output a control signal to the HMI device 500 in order to notify the driver of the host vehicle 10 of the transition to the lane change by manual driving. In this case, the HMI device 500 operates according to the generated control signal control signal, notification (display on a display, sound from a speaker, or the like) of transition to lane change by manual driving is realized.

As described above, by executing the manual operation transition processing P330, it is possible to leave the determination of the lane change to the driver of the host vehicle 10 P320 or when the required space cannot be secured for a long period of time, it is possible to leave the determination of the lane change to the driver of the host vehicle 10. Thus, the lane change process can be continued when it can be determined that the lane change is possible according to the driving determination of the driver. As a result, the possibility of lane change can be increased.

Figure 4:
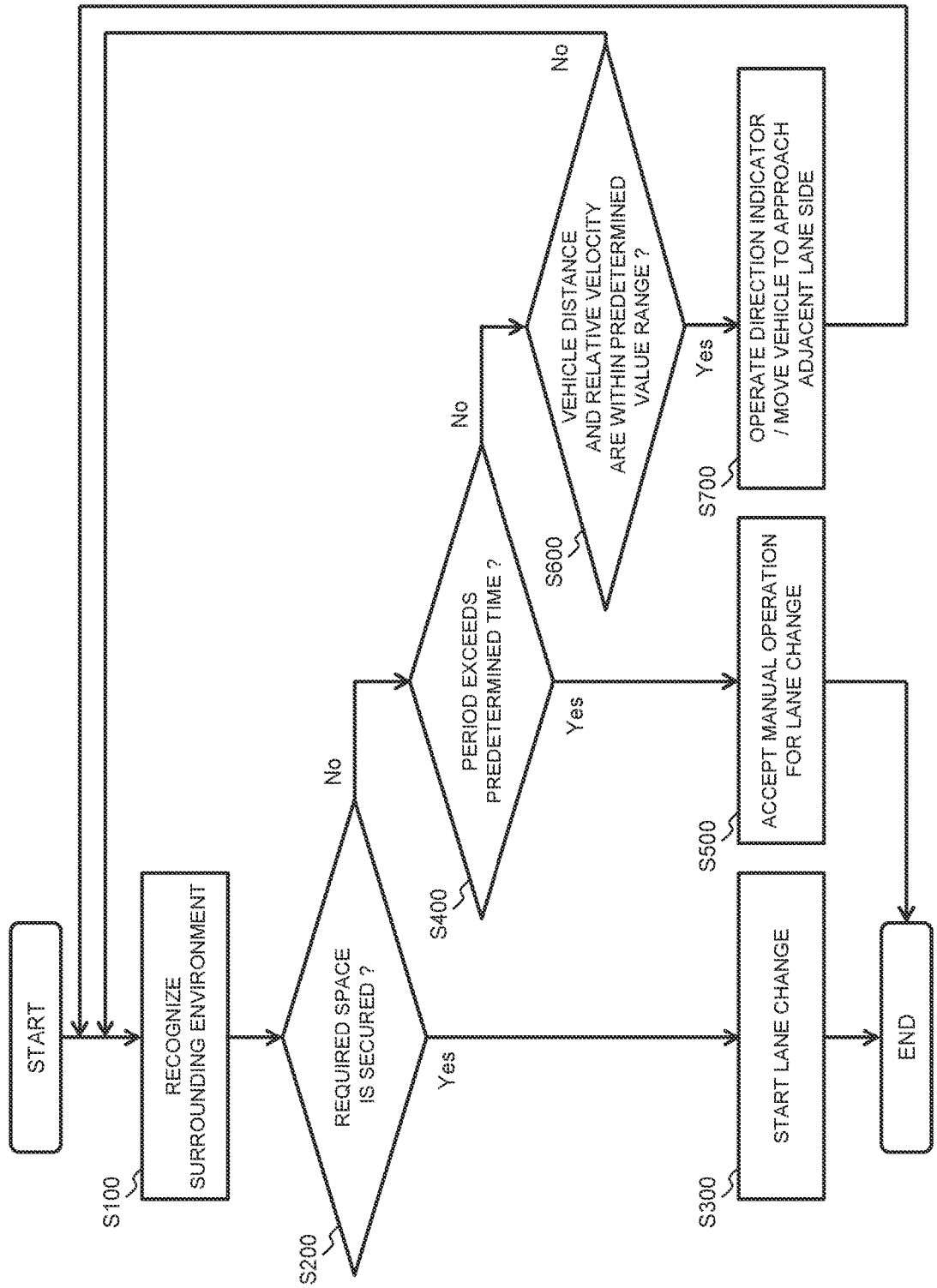
FIG. 4 is a diagram showing an example of processes executed by one or more processors according to the present embodiment.

FIG. 4 is a flowchart illustrating an example of processing executed by the processor 110 in the lane change process. The flowchart illustrated in FIG. 4 starts, for example, when the control apparatus 100 acquires a lane change request.

In operation S100, the processor 110 performs surrounding environment recognition processing P100 to recognize the surrounding environment of the host vehicle 10.

In step S200, the processor 110 determines whether or not the required space can be secured in the adjacent lane which is the lane change destination based on the recognition result in step S100. In a case where the required space is secured (step S200; Yes), the processor 110 executes the LC execution processing P310 and starts lane change by autonomous driving (step S300). When the required space has not been secured (step S200; No), the processing proceeds to step S400.

In step S400, the processor 110 determines whether or not a period during which it is determined that the required space is not secured in step S200 exceeds a predetermined time. If the time exceeds the predetermined time (step S400; Yes), the processor 110 executes manual operation transition processing P330 and accepts a lane change by manual driving (step S500). When the predetermined time is not exceeded (step S400; No), the processing proceeds to step S600.

In operation S600, the processor 110 determines whether an inter-vehicle distance and a relative velocity between the host vehicle 100 and the following vehicle 21 and the preceding vehicle 22 are included in a predetermined valued range. When the inter-vehicle distance and the relative velocity between the host vehicle 100 and the following vehicle 21 and the preceding vehicle 22 are included in the predetermined valued range (step S600; Yes), the processor 110 executes the LC intent notification processing P320, and executes control for operating the direction indicator of the vehicles and control for causing the vehicles to travel closer to the adjacent lane side (step S700). The processor 110 may be configured to execute the control for causing the vehicle to travel closer to the adjacent lane side after a certain period of time has elapsed since the direction indicator of the vehicle is operated. Thereafter, the process returns to step S100 to repeat the processing. On the other hand, when the inter-vehicle distance and the relative velocity between the host vehicle 100 and the following vehicle 21 and the preceding vehicle 22 are not included in the predetermined valued range (step S600; No), the processor 110 returns to step P320 without executing the LC intent notification processing S100, and repeats the processing.

In this way, the processor 110 executes the processing in the lane change process. In addition, the vehicle control method according to the present embodiment is realized by the processor 110 executing processing in this manner. Further, by configuring the computer program 121 that causes the processor 110 to execute processing in this manner, the control program according to the present embodiment is realized.

3. Practical Example

Figure 5:
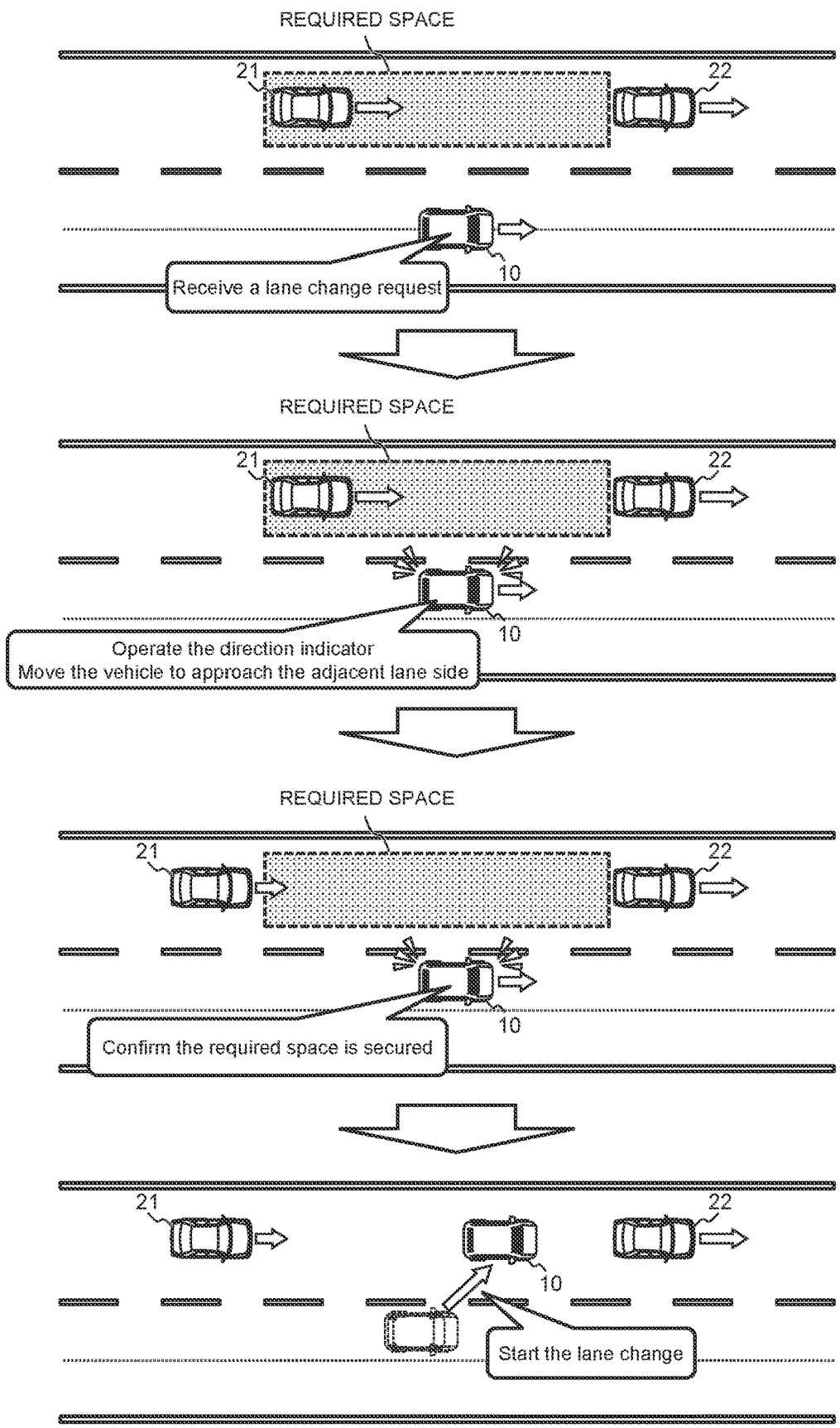
FIG. 5 is a diagram showing a practical example of the present embodiment.

FIG. 5 shows a practical example of a lane change process executed by the control apparatus 100 according to the present embodiment. In FIG. 5, a practical example of the lane change process executed by the control apparatus 100 is shown in four stages in chronological order.

In a first step, the control apparatus 100 acquires a lane change request. Then, the control apparatus 100 determines whether or not the required space is secured in the adjacent lane of the lane change destination. In the practical example shown in FIG. 5, the required space is not secured at this stage. When the required space is secured at this stage, the control apparatus 100 executes the lane change of the host vehicle 10 by autonomous driving.

Since the required space is not secured, the control apparatus 100 operates the direction indicator of the host vehicle 10 in the second stage. In addition, the control apparatus 100 causes the host vehicle 10 to travel closer to the adjacent lane side. As a result, it can be expected that the required space is secured by decelerating the following vehicle 21 or the like.

Next, in the third stage, the control apparatus 100 confirms that the required space has been secured. After the second stage, when a period during which the required space is not secured exceeds a predetermined time, the control apparatus 100 may accept a lane change by manual driving.

Since the required space can be secured, the control apparatus 100 executes lane change of the host vehicle 10 by autonomous driving in the fourth stage.

In this way, the control apparatus 100 according to the present embodiment can execute the lane change process with a high possibility of executing a lane change.

What is claimed is:

1. A control apparatus for controlling a vehicle, configured to execute:
    determining whether or not a required space for performing a lane change is secured in an adjacent lane in response to a request for the lane change to the adjacent lane of the vehicle;
    operating a direction indicator of the vehicle when the required space is not secured; and
    starting the lane change to the adjacent lane of the vehicle by autonomous driving when the required space is secured,
    wherein the operating the direction indicator of the vehicle includes operating the direction indicator under a further condition that an inter-vehicle distance and a relative velocity between the vehicle and each of a following vehicle and a preceding vehicle in the adjacent lane to be the lane change destination are within a predetermined value range.

2. The control apparatus according to claim 1, further configured to execute, simultaneously with or after elapse of a predetermined time from the operating the direction indicator, moving the vehicle to approach the adjacent lane side in a current lane.

3. The control apparatus according to claim 1, further configured to execute accepting manual operation for the lane change when a period during which the required space is not secured exceeds a predetermined time.

4. A control method for controlling a vehicle, including:
    determining whether or not a required space for performing a lane change is secured in an adjacent lane in response to a request for the lane change to the adjacent lane of the vehicle;
    operating a direction indicator of the vehicle when the required space is not secured; and
    starting the lane change to the adjacent lane of the vehicle by autonomous driving when the required space is secured,
    wherein the operating the direction indicator of the vehicle includes operating the direction indicator under a further condition that an inter-vehicle distance and a relative velocity between the vehicle and each of a following vehicle and a preceding vehicle in the adjacent lane to be the lane change destination are within a predetermined value range.

5. A control apparatus for controlling a vehicle, configured to execute:
    determining whether or not a required space for performing a lane change is secured in an adjacent lane in response to a request for the lane change to the adjacent lane of the vehicle;
    operating a direction indicator of the vehicle when the required space is not secured;
    starting the lane change to the adjacent lane of the vehicle by autonomous driving when the required space is secured; and
    execute accepting manual operation for the lane change when a period during which the required space is not secured exceeds a predetermined time.

* * * * *